United States Patent
Lin et al.

(10) Patent No.: US 7,425,949 B2
(45) Date of Patent: Sep. 16, 2008

(54) POWER SUPPLY FOR AN LCD PANEL

(75) Inventors: Yung-Lin Lin, Palo Alto, CA (US); Da Liu, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

(21) Appl. No.: 11/111,642

(22) Filed: Apr. 21, 2005

(65) Prior Publication Data
US 2005/0212790 A1  Sep. 29, 2005

Related U.S. Application Data

(62) Division of application No. 10/414,374, filed on Apr. 15, 2003, now Pat. No. 6,936,975.

(51) Int. Cl.
G09G 3/36 (2006.01)
G09G 5/00 (2006.01)
H05B 37/02 (2006.01)
H05B 39/04 (2006.01)
H05B 41/36 (2006.01)

(52) U.S. Cl. .................. 345/211; 345/102; 315/224

(58) Field of Classification Search ......... 345/211–213, 345/87–103, 204; 315/224
See application file for complete search history.

(56) References Cited

U.S. PATENT DOCUMENTS

| | | | |
|---|---|---|---|
| 6,304,137 B1* | 10/2001 | Pullen et al. | 330/10 |
| 6,310,444 B1* | 10/2001 | Chang | 315/282 |
| 6,580,229 B2* | 6/2003 | Murakami et al. | 315/224 |
| 6,717,372 B2* | 4/2004 | Lin et al. | 315/282 |
| 6,750,842 B2* | 6/2004 | Yu | 345/102 |
| 6,812,916 B2* | 11/2004 | Hwang | 345/102 |
| 2002/0130628 A1* | 9/2002 | Shin | 315/312 |
| 2003/0151601 A1* | 8/2003 | Chung et al. | 345/211 |
| 2004/0032223 A1* | 2/2004 | Henry | 315/291 |

* cited by examiner

*Primary Examiner*—Amr Awad
*Assistant Examiner*—Stephen G Sherman
(74) *Attorney, Agent, or Firm*—Grossman, Tucker, Perreault & Pfleger, PLLC

(57) ABSTRACT

A power supply system is provided for a multiple lamp LCD panel. In one aspect, the power supply includes a plurality of transformers for driving a plurality of respective CCFLs. The primary sides of each transformer are coupled in series to thereby reduce the stress on each transformer. For LCD panels that include longer CCFLs, a power supply is provided that includes a plurality of transformers for driving a plurality of respective CCFLs. The primary sides of each transformer are coupled in series and each lamp is coupled to two secondary sides of the transformers, thereby reducing the problems associated with longer CCFL tubes. In any of the embodiments, the power supply can be adapted to convert a high voltage DC signal to high voltage AC used to power the lamps.

7 Claims, 12 Drawing Sheets

CLASS D

POWER SUPPLY FOR AN LCD PANEL

CROSS-REFERENCE TO RELATED APPLICATIONS

This application is a divisional of U.S. patent application Ser. No. 10/414,374 filed Apr. 15, 2003, now U.S. Pat. No. 6,936,975.

FIELD OF THE INVENTION

The present invention relates to a power supply for an LCD panel display, and more particularly, to a backlight power supply that provides power for multiple CCFLs for a Liquid Crystal Display Television (LCDTV).

BACKGROUND OF THE INVENTION

FIG. 1 depicts a conventional power supply system 10 for an LCD panel. In the conventional system, the utility power, 110V/220V ac system is converted to a high-voltage dc either through a rectifier circuit or a power factor correction circuit 12. The high-voltage dc is then step down through a dc/dc converter 14 to provide low voltages, for example, 5V and 12V as the power sources for electronic devices such as micro-controller, memory, TFT driver, graphics and cold-cathode fluorescent lamps (CCFLs). The inverter 16 further converts the low-voltage dc to a high-voltage ac to provide power for the CCFLs in the LCD panel 18. Multiple power conversions through the DC/DC converter 14 and DC/AC inverter 16 impacts the conversion efficiency and also generates heat in the system. For large LCD panels such as for LCDTV applications, the majority of power consumption resides in CCFLs. Therefore, it is important to boost the efficiency of the inverter for the CCFLs.

FIG. 2 illustrates one conventional topology 20 that improves the efficiency of the inverter system. The high-voltage dc is directly applied to the DC/AC converter 16'. It eliminates an intermediate step of DC/DC converter and improves the overall efficiency.

Converting a high-voltage dc to an ac signal requires a lower turns-ratio transformer to the CCFL as illustrated in FIG. 3, FIG. 3A and FIG. 4. FIG. 3 depicts an inverter topology 30 that is built around a half bridge circuit (two switches) and includes an inverter controller 32 that drives two switches 34 and 36 to develop the necessary voltage across the transformer 38. The inverter controller 32 and half bridge topologies are well known in the art. FIG. 3A depicts a Class D inverter topology and FIG. 4 depicts a full bridge (four switch) inverter topology, as are well understood in the art. The topology also depicts feedback lines which are not important for this discussion. Since the size of the transformer is selected based on the CCFL applications, the secondary winding which drives the CCFL is generally fixed by the load requirements. However, the number of turns in the primary winding in high-voltage input application is much higher than the transformer being driven by the low-voltage input such as 5V to 20V DC, and this increases the complexity and cost of the transformer.

SUMMARY OF THE INVENTION

In one aspect the present invention provides a power supply system for an LCD panel that includes:

an inverter controller operable to control a plurality of switches for converting a DC signal to a high voltage AC signal;

a plurality of transformers receiving the high voltage AC signal and each generating a high voltage sinusoidal signal, wherein each said transformer having a primary side and a secondary side and wherein each primary side being coupled in series with each other across the high voltage AC signal; and an LCD panel comprising a plurality of cold cathode fluorescent lamps, each lamp being powered by a respective secondary side of said transformer.

In another aspect, the present invention provides a power supply system for an LCD panel that includes:

an inverter controller operable to control a plurality of switches for converting a DC signal to a high voltage AC signal;

a plurality of transformers receiving said high voltage AC signal and each generating a high voltage sinusoidal signal, wherein each said transformer having a primary side and a secondary side and wherein each said primary side being coupled in series with each other across said high voltage AC signal; and an LCD panel comprising a plurality of cold cathode fluorescent lamps, each said lamp being powered by at least two respective secondary sides of said transformers.

In any of the described herein embodiments, the power supply can be adapted to convert a high voltage DC signal to high voltage AC used to power the lamps.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Usually, there are multiple CCFLs in LCDTV applications to provide sufficient brightness on the LCD screen, for example, 4 to 32 CCFLs depending on the size of the LCD panel. In one aspect of the present invention the primary winding of the transformers are coupled in series in the power conversion process.

Figure 4:
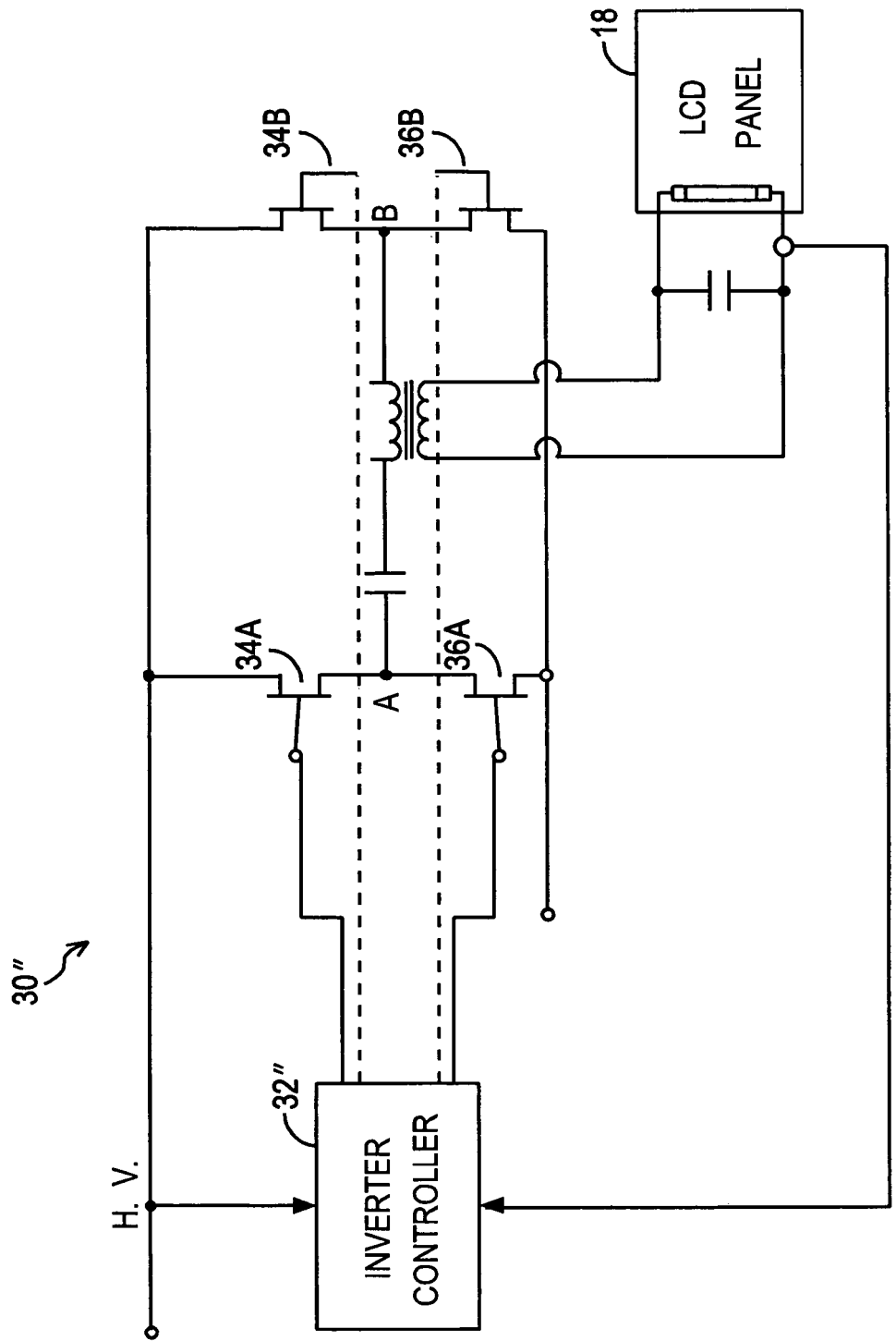
FIG. 4 is another circuit diagram of a conventional inverter topology for an LCD panel.
Figure 5:
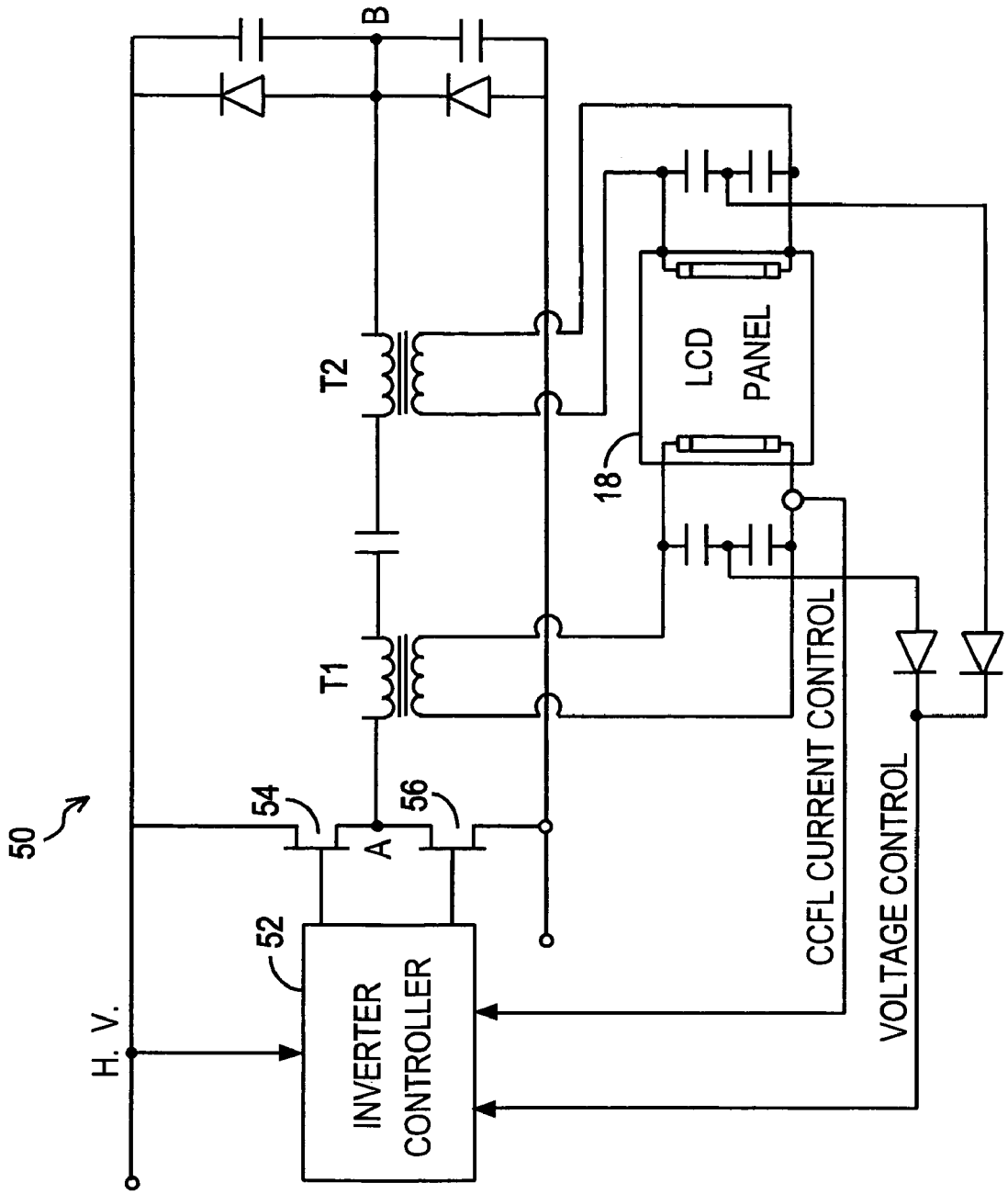
FIG. 5 is an inverter topology for an LCD panel according to one exemplary embodiment of the present invention.
Figure 5A:
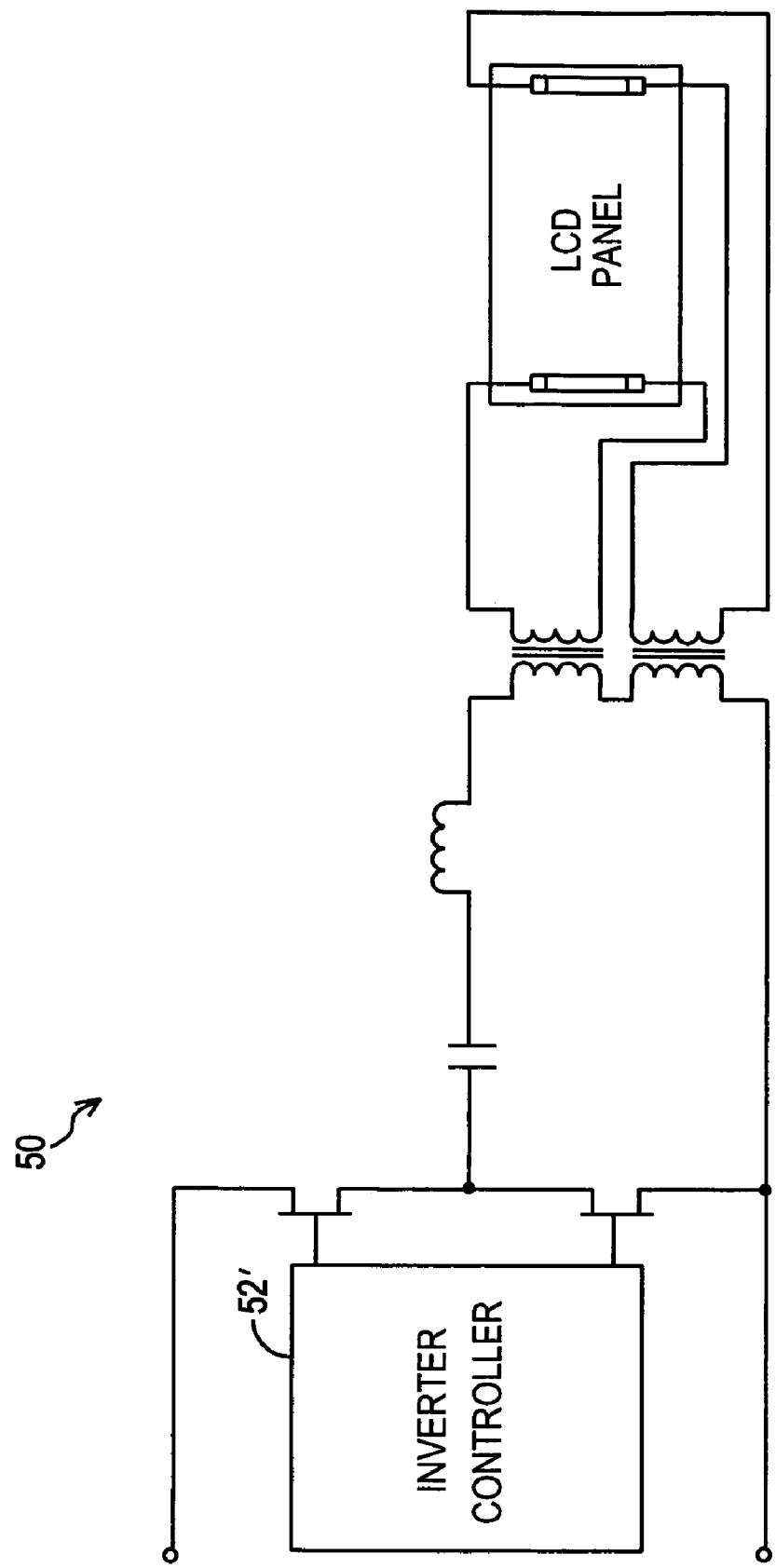
FIG. 5A is an inverter topology for an LCD panel according to another exemplary embodiment of the present invention.

FIG. 5 is an inverter topology 50 for an LCD panel according to one exemplary embodiment of the present invention. In this exemplary embodiment, each primary side of the transformers T1 and T2 is connected in series. Therefore, each primary side sees half of the input voltage across the winding. This operates to reduce the number of turns into half as comparing to transformer primary winding in FIG. 4. In half-bridge applications as depicted in FIG. 5, placing the primary side of the transformers in series reduces to one-fourth of the input voltage across each winding, and the voltage stress reduced to 1/(2N) of the input voltage when applied to a half-bridge application (where N is the number of transformers coupled in series). Of course, the topology of FIG. 4 can be modified to a full bridge topology, in which case the voltage stress on each primary winding would be reduced to 1/N of the input voltage when N transformers are connected with their primary winding in series. FIG. 5A depicts a class D inverter topology, having similar advantages as set forth above with respect to FIG. 5 since the primary side of the transformers are coupled in series.

Figure 6:
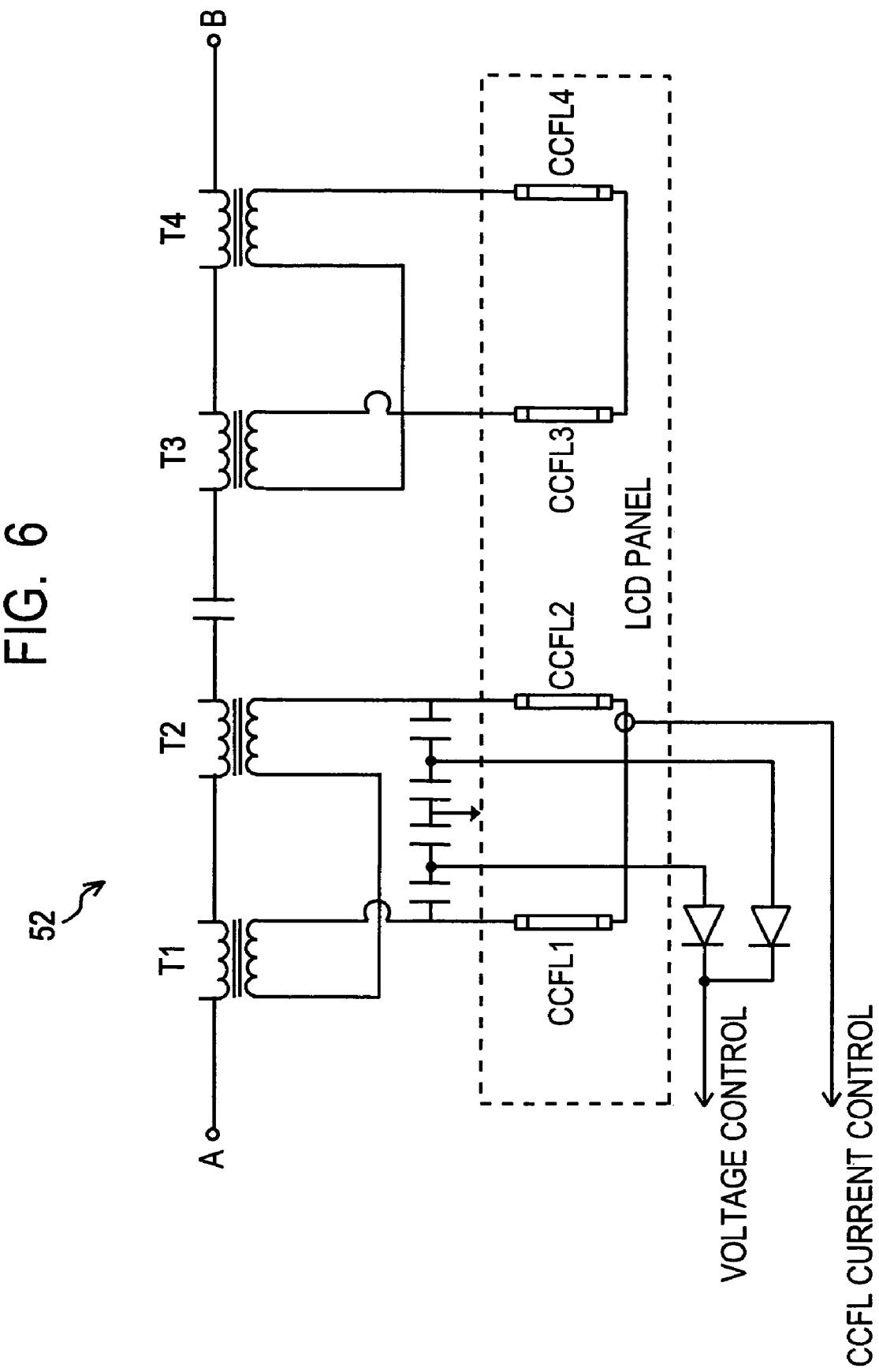
FIG. 6 is a circuit diagram of the transformers and LCD panel of the inverter topology according to the present invention.

FIG. 6 is a circuit diagram 52 of the transformers and LCD panel of the inverter topology according to the present invention. In this figure, the concept is extended to power four CCFL lamps by coupling four primary sides T1, T2, T3, and T4 in series between points A and B of FIG. 5. Likewise, this topology 52' is extended to N lamps in FIG. 7 which depicts N CCFLs powered by N transformers.

Since each of the primary winding is connected in series, the current flowing through each transformer primary side is identical during the turn-on, turn-off of the switched network (i.e., the switches of the half bridge, full bridge or Class D circuits). The switched network is connected to point "A" and "B" in FIGS. 5, 6 and 7. This configuration further improves the current balance in the secondary side of each transformer driving the CCFLs.

Figure 8:
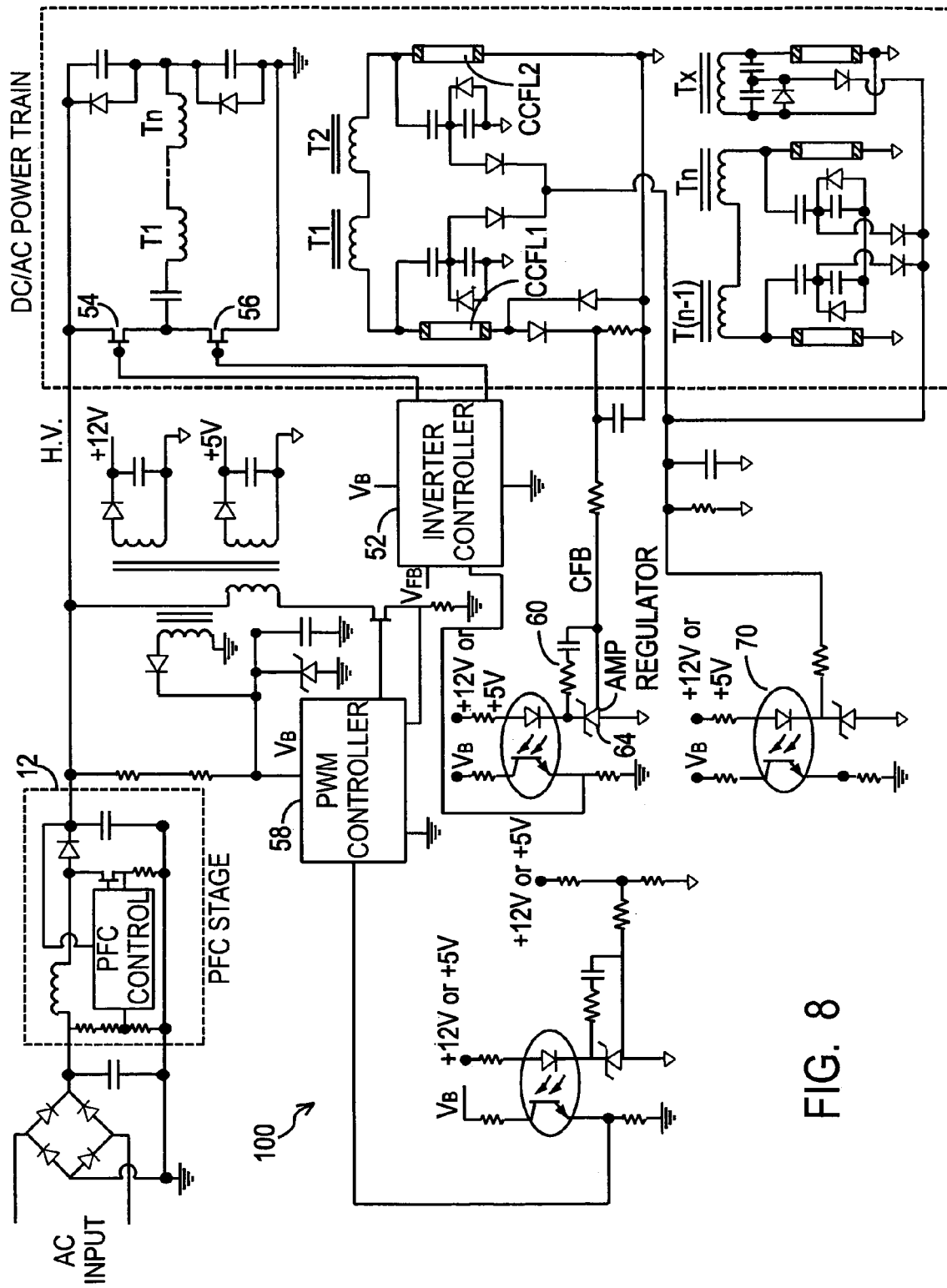
FIG. 8 is a detailed circuit diagram of the LCD power supply system of the present invention.

FIG. 8 depicts a detailed circuit diagram of an exemplary LCD power supply system 100 of the present invention. This power supply includes an inverter controller 52 that drives two switches 54 and 56 in a half bridge circuit, as described in FIG. 5 above. The inverter controller 52 includes voltage and current feedback to control the energy of the CCFLs coupled to the circuit. Each CCFL is driven by a primary side transformer that is coupled in series as shown (i.e., T1, T2 . . . T(n−1), Tn, Tx; where n represents an even number of lamps, and x represents an odd number of lamps) according to the principles and description set forth above.

Current feedback is developed with feedback circuitry 60 which is derived from lamps 1 and 2 in the circuit as shown. The exemplary current feedback circuit 60 includes an opto-coupler 62 and a regulator 64. The regulator amplifies the current feedback signal Cfb and the opto-coupler 62 sends the feedback information to the controller 52. Similarly, voltage feedback information is developed with voltage feedback circuitry 70. In this exemplary embodiment, voltage feedback information is taken from each lamp in the circuit to generate a voltage feedback signal Vb.

The detailed circuit of FIG. 8 also includes other circuitry not directly related to the aspects of the present invention. For example, a PWM controller 58 may be provided to generate DC power supply signals (e.g., 12V and 5V) for other components (e.g., memory, microprocessor, etc.) associated with an LCD display. Likewise, the PFC stage 12 may utilize any conventional and/or custom topology to generate a high voltage DC signal, as described above.

Figure 1:
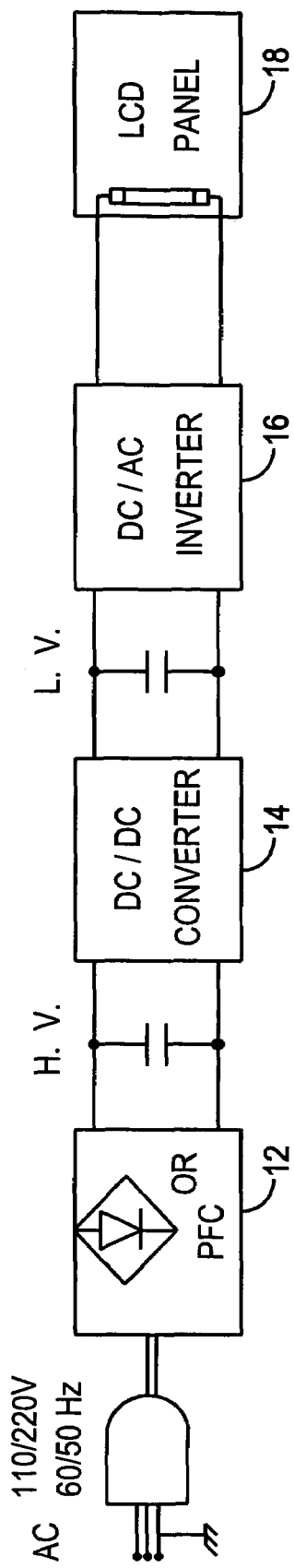
FIG. 1 is a block diagram of a conventional power supply system for an LCD panel.
Figure 2:
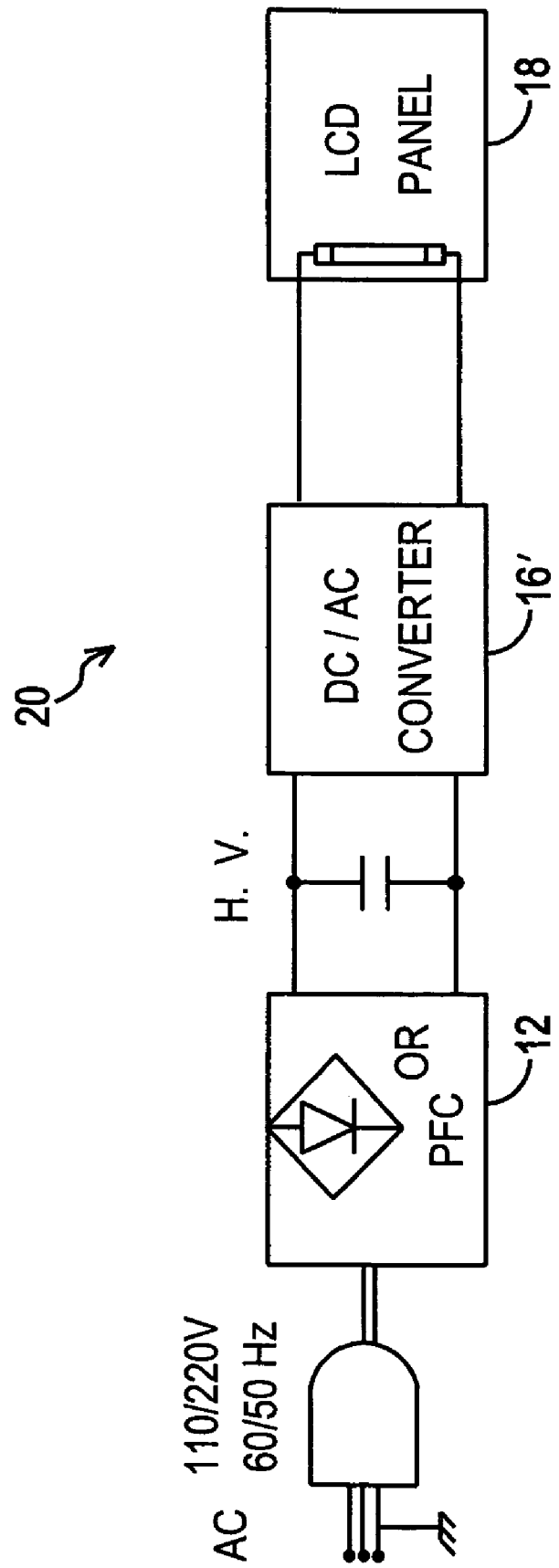
FIG. 2 is a block diagram of another conventional power supply system for an LCD panel.
Figure 3:
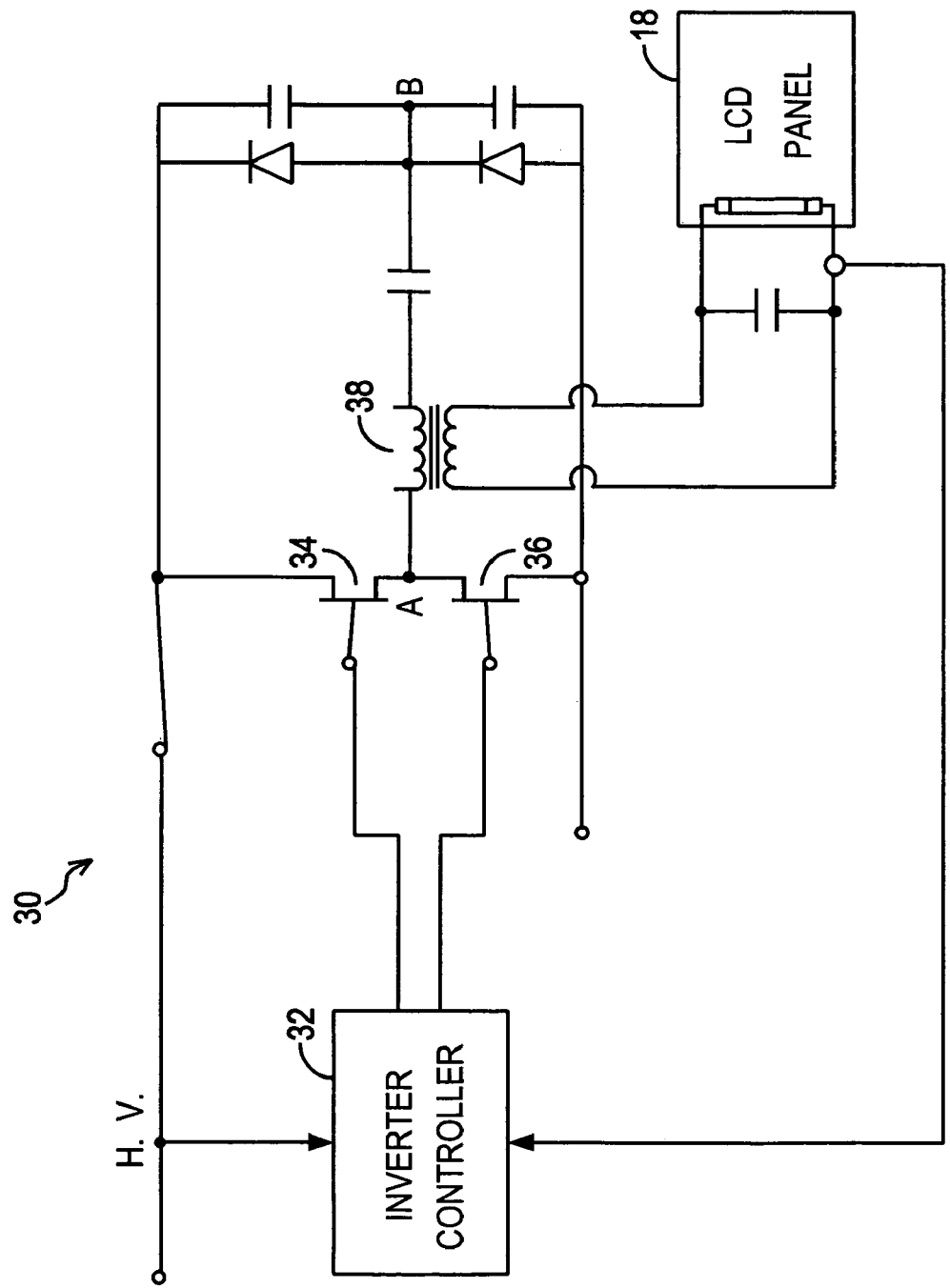
FIG. 3 is a circuit diagram of a conventional inverter topology for an LCD panel.
Figure 3A:
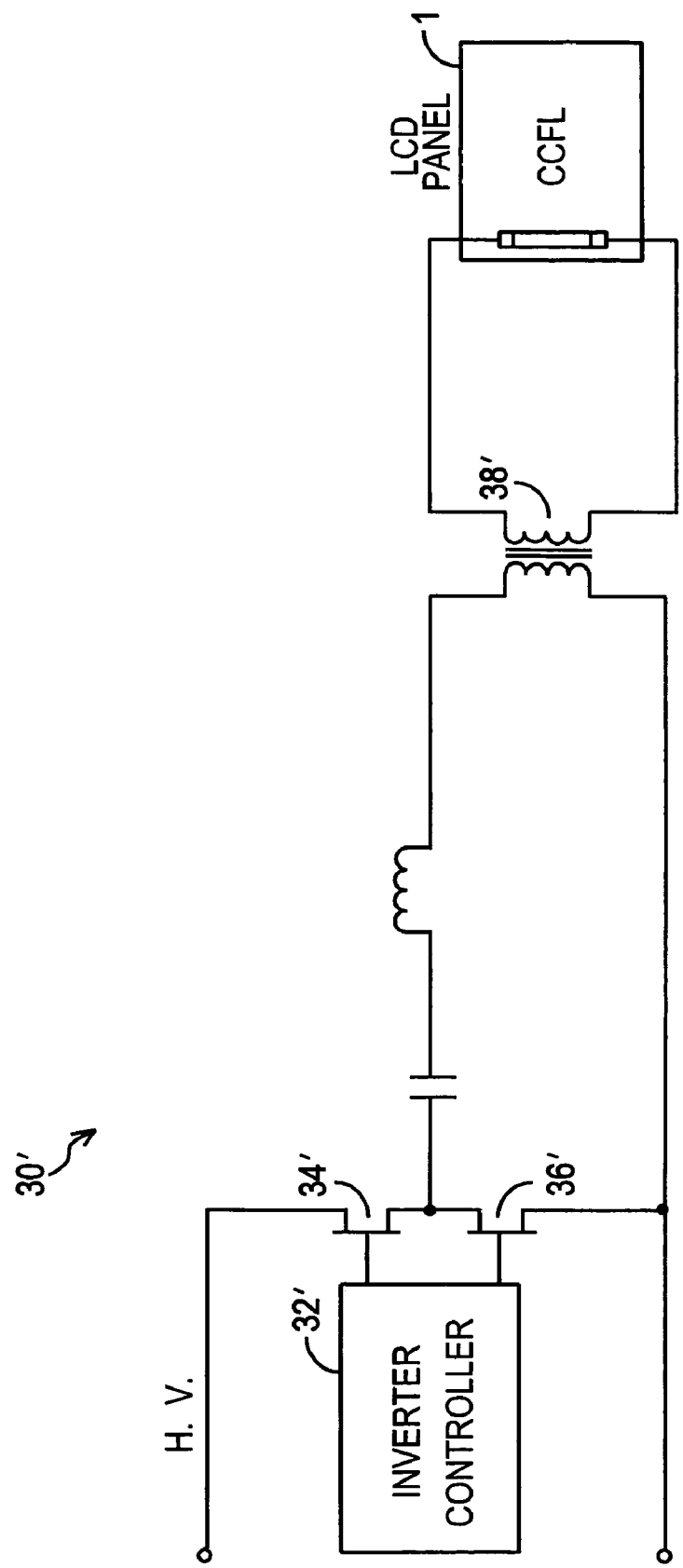
FIG. 3A is another circuit diagram of a conventional inverter topology for an LCD panel.

In another aspect, the present invention provides a circuit topology for driving long CCFL tubes. The size of the CCFL tubes in LCDTV applications is usually longer than those in LCD monitor in portable equipment. Driving longer CCFL becomes more difficult. For example, any lamp longer than approximately 60 cm conventional driving methods, as shown in FIGS. 3, 3A and 4, a high-frequency and high-voltage (normally in the range of 1000V rms) is applied to the CCFL while one side of the CCFL has a potential near chassis ground. Due to the leakage current path between the CCFL and the chassis, these driving methods usually encounter a darkness effect on one side of the CCFL. Long lamp may mean 75-80 cm or longer, and is generally defined as lamps having a leakage capacitance such that it affects electron migration between the electrodes of the lamp.

Figure 9:
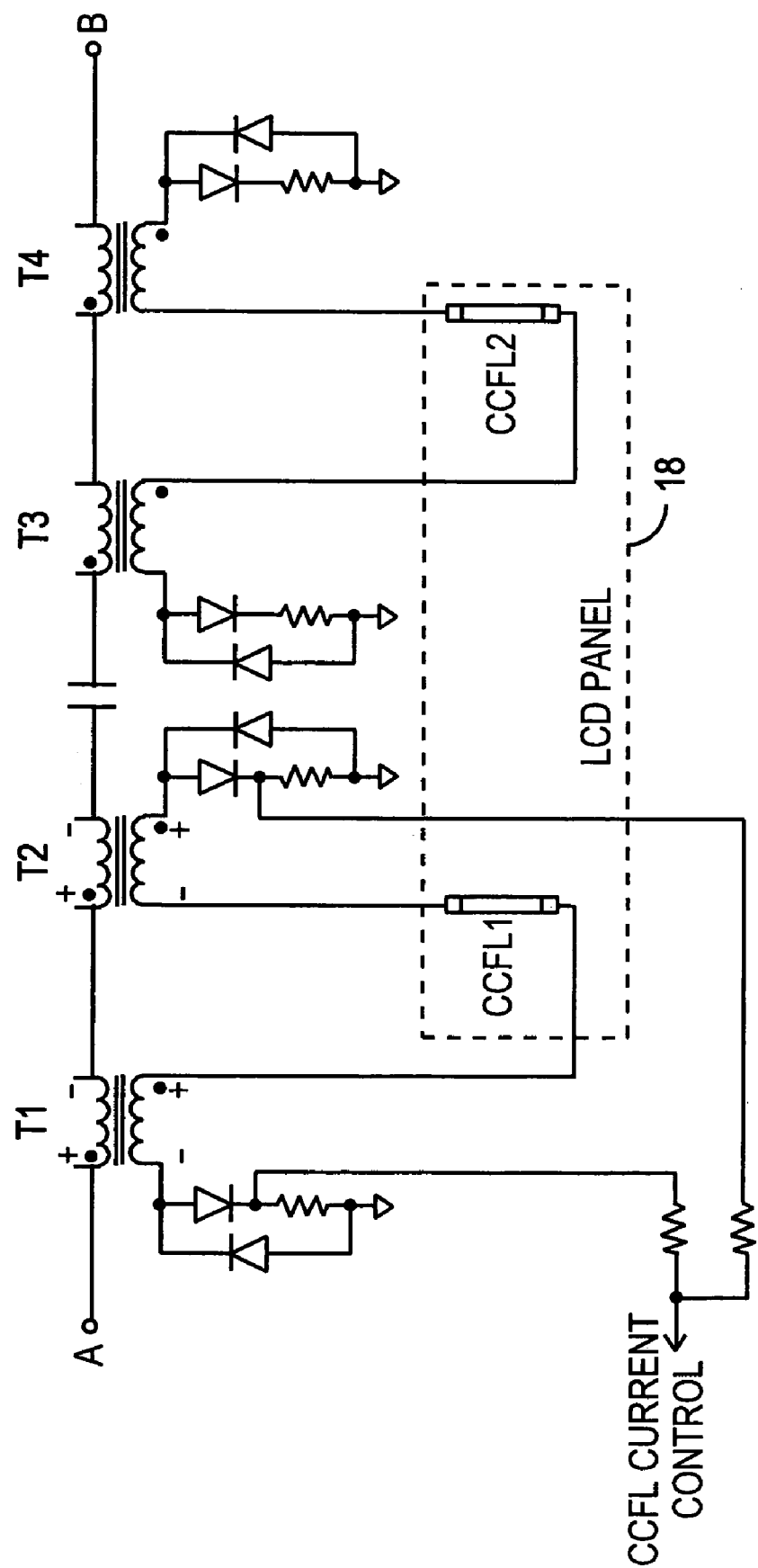
FIG. 9 is another circuit diagram of the transformers and LCD panel of the inverter topology according to the present invention and FIG. 10 depicts another driving topology utilizing two controllers and two inverter circuits per CCFL.

To remedy the difficulty, a differential driving technique is provided by the present invention. As illustrated in FIG. 9, a long lamp can be driven with two transformers where the phase polarities of the transformers are opposite. In FIG. 9, CCFL1 is driven by the positive side of the secondary of T1 and the negative side of the secondary of T2 (the positive negative are represented in one half cycle of the sinusoidal power developed by the transformer). The center of CCFL1 is virtually positioned at zero potential. Each transformer delivers, for example 500V rms where the voltage stress and mechanical spacing for safety requirement is lower.

Figure 10:
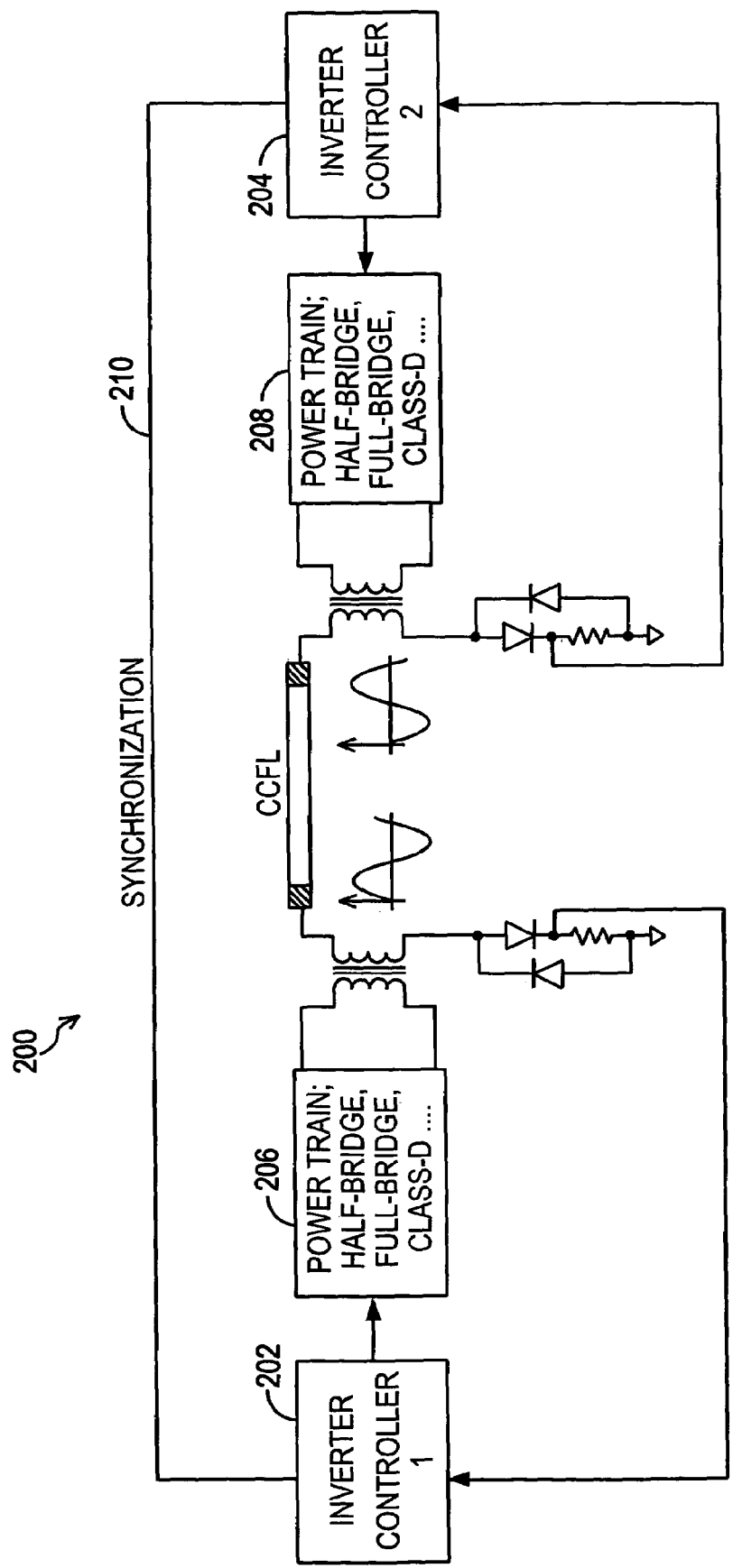

In yet another aspect, the driving techniques may be modified as shown in FIG. 10. FIG. 10 depicts a driving topology 200 utilizing two controllers 202 and 204 and two inverter circuits 206 and 208 per CCFL. The inverter circuits are coupled together using a synchronization signal 210 so that the controllers control their respective inverter circuits to generate sinusoids that are approximately 180 degrees out of phase, as shown. This ensures that the lamp receives full power from each inverter during each half cycle without cancellation of the power signals. Of course, this topology can include voltage and or current feedback to control the energy delivered to the lamp.

The inverter controllers of the present invention may be conventional inverter controllers which may include dimming circuitry (e.g., burst mode, analog, and/or phase) to adjust the energy delivered to the lamps. Inverter controllers capable of controlling half bridge, full bridge, Class D and/or other inverter topologies are well known in the art, and all are deemed equivalent to the present invention. For example, U.S. Pat. Nos. 6,259,615 and 5,615,093, hereby incorporated by reference, each disclose inverter controllers for full bridge and half bridge inverter circuits, respectively. The inverter controllers may also be implemented by, for example Part Nos. OZ960, OZ961, OZ965, OZ970, OZ971, OZ972, or OZ9RR, manufactured by O2Micro International Limited.

Figure 7:
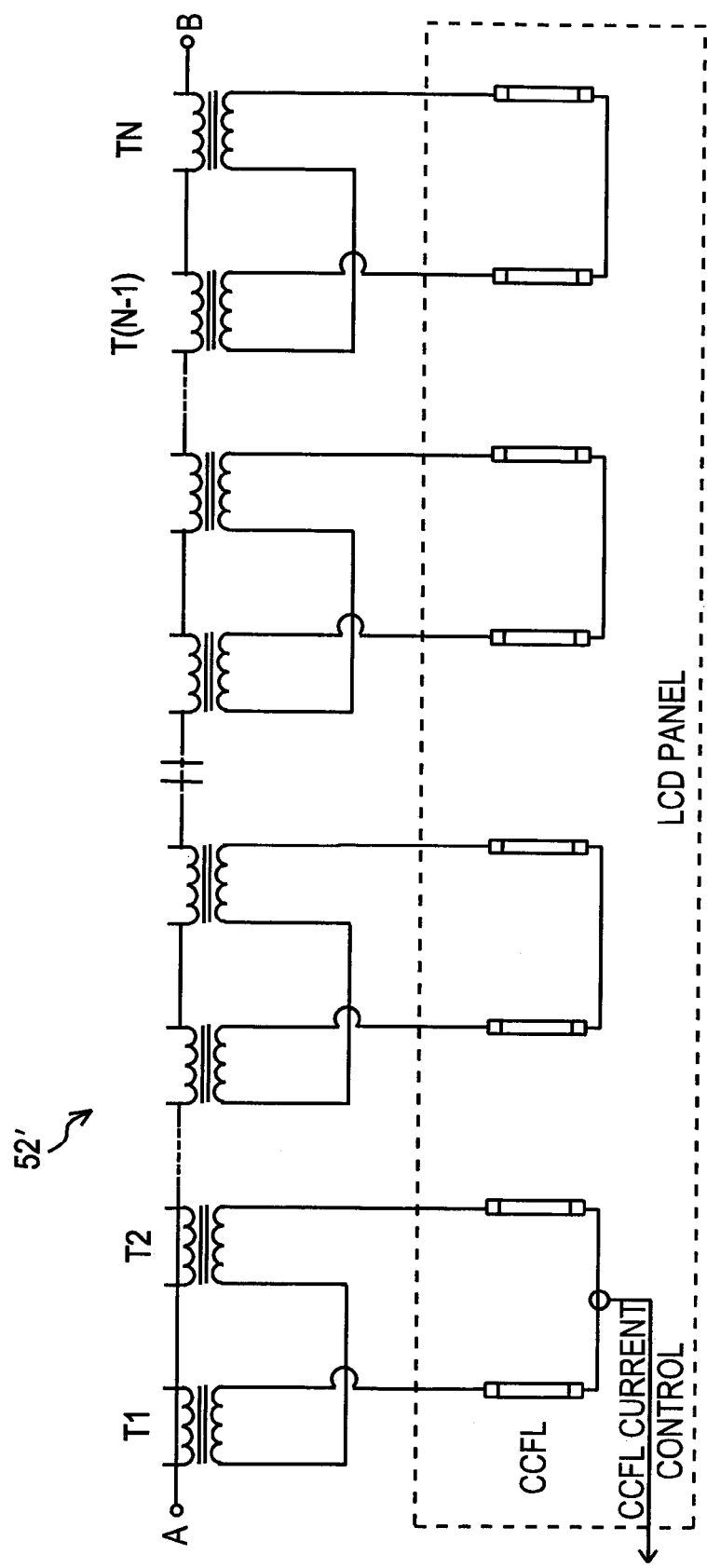
FIG. 7 is another circuit diagram of the transformers and LCD panel of the inverter topology according to the present invention.

Also, it will be readily apparent to those skilled in the art that the figures depict an LCD panel that includes circuitry to generate a voltage and/or current feedback signal indicative of the voltage and/or current conditions at the lamp load. The inverter controller depicted herein is also adapted to receive this feedback information to adjust the voltage and/or current supplied to the lamp loads. In the exemplary embodiments, current feedback can be generated from a single lamp in the two lamp panel of FIGS. 5 and 5A, or from two lamps in an N lamp panel as shown in FIGS. 6, 7 and 8. In FIG. 9, the current feedback control signals are generated from the portion of the transformer secondary side that is not coupled to the lamp. In this manner, each half cycle of current to the lamp is monitored. Likewise, voltage feedback control signals can be generated in a manner understood in the art.

In the exemplary embodiments, the transformers are coupled to the power supply as controlled by the inverter controller. The inverter controller generates a high voltage AC signal (square wave) from the high voltage DC signal source. In turn, the transformers produce high voltage sinusoidal power from the high voltage AC signal to power the lamps. Of course, the present invention can use a low voltage DC power source, in which case the transformers will be adapted to step up the voltage to an appropriate level to power the lamps. Those skilled in the art will recognize numerous modifications to the present invention, all of which are deemed within the spirit and scope of the present invention only as limited by the claims.

The invention claimed is:

1. A high voltage LCD power supply system, comprising:
a first inverter controller coupled to a first power train for converting a DC signal to a first AC signal;
a second inverter controller coupled to a second power train for converting said DC signal to a second AC signal wherein said second AC signal is about 180 degrees out of phase relative to said first AC signal;
a first transformer having a primary side and a secondary side, said primary side of said first transformer directly connected to said first power train and configured to receive said first AC signal, said secondary side of said first transformer having a first terminal and a second terminal, wherein a first feedback circuit is directly connected to said second terminal of said secondary side of said first transformer and said first inverter controller;
a second transformer having a primary side and a secondary side, said primary side of said second transformer directly connected to said second power train and configured to receive said second AC signal, said secondary side of said second transformer having a first terminal and a second terminal, wherein a second feedback circuit is directly connected to said second terminal of said secondary side of said second transformer and said second inverter controller; and
a cold cathode fluorescent lamp directly connected to said first terminal of said secondary side of said first transformer and said first terminal of said secondary side of said second transformer.

2. A power supply system as claimed in claim 1, wherein said first power train and said second power train each comprise a plurality of switches configured in a full bridge circuit configuration, and each said controller is configured to control each respective full bridge circuit.

3. A power supply system as claimed in claim 1, wherein said first power train and said second power train each comprise a plurality of switches configured in a half bridge circuit configuration, and each said controller is configured to control each respective half bridge circuit.

4. A power supply system as claimed in claim 1, wherein said first power train and said second power train each comprise a plurality of switches configured in a class D circuit configuration, and each said controller is configured to control each respective class D circuit.

5. A power supply system as claimed in claim 1, wherein at least one of said feedback circuits is configured to generate a current feedback signal indicative of cuffent supplied to said lamp and said at least one respective controller is configured to adjust the cuffent delivered to said lamp.

6. A power supply system as claimed in claim 1, wherein at least one of said feedback circuits is configured to generate a voltage feedback signal indicative of voltage supplied to said lamp and said at least one respective controller is configured to adjust the voltage delivered to said lamp.

7. A power supply system as claimed in claim 1, wherein said second inverter controller is synchronized with said first inverter controller to maintain said second AC signal about 180 degrees out of phase relative to said first AC signal.

* * * * *